United States Patent [19]

Yamamoto et al.

[11] Patent Number: 5,516,862

[45] Date of Patent: May 14, 1996

[54] PROCESS FOR PRODUCING ETHYLENE-ALPHA-OLEFIN COPOLYMER RUBBER

[75] Inventors: Keisaku Yamamoto; Kizuku Wakatsuki, both of Ichihara; Hayato Saba, Funabashi; Tadaaki Nishiyama, Ichihara, all of Japan

[73] Assignee: Sumitomo Chemical Company, Limited, Osaka, Japan

[21] Appl. No.: 300,550

[22] Filed: Sep. 7, 1994

[30] Foreign Application Priority Data

Sep. 7, 1993 [JP] Japan ................................. 5-222353

[51] Int. Cl.$^6$ ............................. C08F 4/20; C08F 2/06
[52] U.S. Cl. ..................... 526/143; 526/142; 526/283; 526/336; 526/339; 526/348
[58] Field of Search ................................. 526/142, 283, 526/143

[56] References Cited

U.S. PATENT DOCUMENTS 3,457,244  7/1969  Fukuda ................................. 526/142

FOREIGN PATENT DOCUMENTS 49-14542  4/1974  Japan.

*Primary Examiner*—Fred Zitomer
*Attorney, Agent, or Firm*—Cushman Darby & Cushman

[57] ABSTRACT

A process for producing ethylene-α-olefin copolymer rubbers which comprises mixing a vanadium compound-containing solution and an alcohol-containing solution with stirring for 10–600 seconds to obtain a mixed solution, immediately feeding the mixed solution into a polymerization vessel containing an organoaluminum compound, and copolymerizing ethylene and an α-olefin, or ethylene, an α-olefin and a non-conjugated diene compound in the polymerization vessel. According to this process, the activity of polymerization catalyst can be maintained at a high level, no by-product of the reaction of the vanadium compound and the alcohol is deposited as precipitate in the apparatus and no such additional operations as bubbling is necessary.

18 Claims, 1 Drawing Sheet

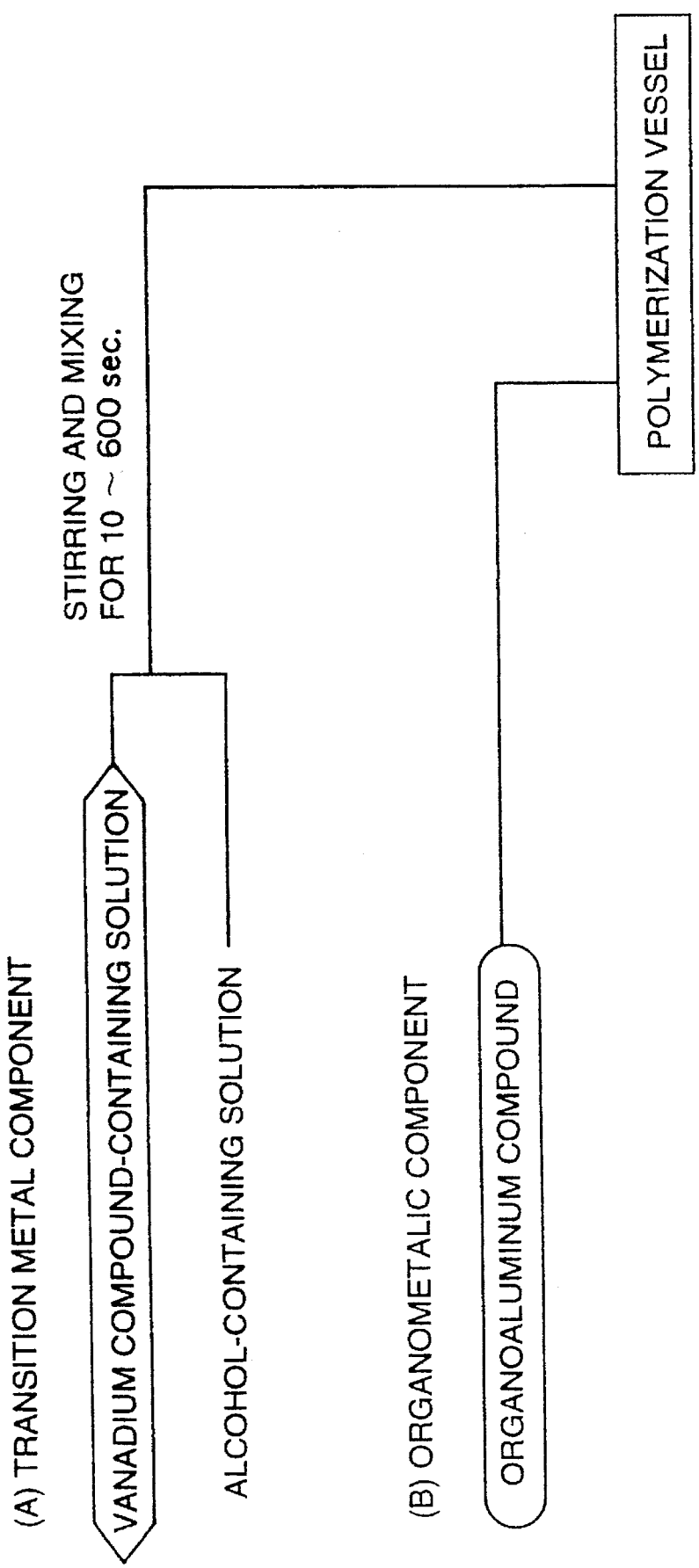

PROCESS FOR PRODUCING ETHYLENE-ALPHA-OLEFIN COPOLYMER RUBBER

BACKGROUND OF THE INVENTION

The present invention relates to a process for producing ethylene-α-olefin copolymer rubbers.

It is already known to copolymerize ethylene and an α-olefin, or ethylene, an α-olefin and a non-conjugated diene compound by using a so-called Ziegler catalyst comprising a vanadium compound and an organoaluminum compound. It is also known to prepare a vanadium compound containing an alkoxy group by reacting a vanadium compound and an alcohol. As to a concrete method of using a vanadium compound containing an alkoxy group for polymerization, there is known a process which comprises separately feeding a vanadium compound and an alcohol into an inert hydrocarbon solvent containing an organoaluminum compound in a polymerization vessel, followed by mixing, to use for polymerization. This process, however, has a problem of greatly lowering the polymerization activity of the catalyst. In another known method, an inert hydrocarbon solution containing a vanadium compound and an inert hydrocarbon solution containing an alcohol are mixed beforehand in a batch type mixing vessel and the resulting solution is fed into an inert hydrocarbon solution containing an organoaluminum compound, to be used for polymerization. This method, however, has a problem in that the by-product of the reaction of the vanadium compound and the alcohol deposits in the mixing vessel as a precipitate and catalytic activity is lowered. As a method for solving such problems, JP-B-49-14542 discloses a process wherein the side reaction is suppressed by bubbling an inert gas such as nitrogen through the mixed solution containing a vanadium compound and an alcohol and thereby removing the protonic acid present in the solution. In such a process, which requires additional operation steps, however, neutralization treatment of a gas containing a large amount of corrosive substances is necessary and further, since a part of the inert hydrocarbon solvent is vaporized off, an environmental problem relating to air pollution takes place and the concentration of the catalyst fluctuates, which necessitates readjustment of the catalyst concentration to the intended level. Thus, this process is disadvantageous from the viewpoint of industrial operation.

SUMMARY OF THE INVENTION

In view of such situations, the object of the present invention is to provide a process for producing ethylene-α-olefin copolymer rubbers which can solve the problems of the prior art, can maintain the activity of polymerization catalyst at a sufficiently high level, does not cause the reaction by-product of a vanadium compound and an alcohol to deposit as precipitate in the apparatus, and does not need such additional operations as bubbling.

Thus, the present invention relates to a process for producing ethylene-α-olefin copolymer rubbers which comprises mixing a vanadium compound-containing solution (a solution containing a vanadium compound) and an alcohol-containing solution (a solution containing an alcohol) with stirring for 10–600 seconds to obtain a mixed solution, immediately feeding the mixed solution into a polymerization vessel containing an organoaluminum compound, and copolymerizing ethylene and an α-olefin, or ethylene, an α-olefin and a non-conjugated diene compound in the polymerization vessel.

BRIEF DESCRIPTION OF THE DRAWING

FIG. 1 is a flow chart showing the step of producing a catalyst.

DETAILED DESCRIPTION OF THE INVENTION

The ethylene-α-olefin copolymer rubbers referred to in the present invention are copolymer rubbers formed essentially from ethylene and an α-olefin and copolymer rubbers formed essentially from ethylene, an α-olefin and a non-conjugated diene compound.

The α-olefin includes, for example, propylene, butene-1, pentene-1, hexene-1, heptene-1, octene-1, isobutylene and 4-methylpentene-1. The non-conjugated diene compound includes, for example, 1,4-pentadiene, 1,4-hexadiene, 1,5-cyclooctadiene, 6-methyl-4,7,8,9-tetrahydroindene, dicyclopentadiene, 5-vinyl-2-norbornene, and 5-ethylidene-2-norbornene. These non-conjugated dienes may be used each alone or in a combination of two or more thereof.

The proportion of ethylene, and α-olefin and a non-conjugated diene compound in the copolymer rubber is not particularly limited and may be, for example, 40–95% by mole of ethylene, 5–60% by mole of an α-olefin and 0–10% by mole of a non-conjugated diene compound. In order that the copolymer rubber intended in the present invention may have a sufficient rubber elasticity, the proportion is preferably 45–80% by mole of ethylene, 20–55% by mole of an α-olefin and 0–5% by mole of a non-conjugated diene compound.

The vanadium compound-containing solution is a solution of a vanadium compound dissolved in an inert hydrocarbon solvent. The vanadium compound includes preferably a halogen-containing vanadium compound, for example, vanadium tetrachloride, vanadium tetrabromide and a vanadium oxyhalide represented by the formula $VOY_3$ (Y being a halogen). Specific examples of vanadium oxyhalides include vanadium oxytrichloride and vanadium oxytribromide. Among them, particularly preferred is vanadium oxytrichloride. The inert hydrocarbon solvent includes, for example, hexane and heptane. The concentration of the vanadium compound in the solution is not particularly limited and usually 0.01–5.0 mole/l.

The alcohol-containing solution is a solution of an alcohol in an inert hydrocarbon solvent but, if necessary and desired, a 100% alcohol may be used as it is. Various alcohols, such as aromatic alcohols and aliphatic alcohols may be used, but alcohols having an aliphatic hydrocarbon of 1–12 carbon atoms are preferable. Specific examples of the alcohol include methyl alcohol, ethyl alcohol, n-propyl alcohol, isopropyl alcohol, n-butyl alcohol, sec-butyl alcohol, tert-butyl alcohol, isobutyl alcohol, isoamyl alcohol, n-hexyl alcohol, n-heptyl alcohol, 2-ethylhexyl alcohol, n-octyl alcohol, and dodecyl alcohol. Diols and polyols, for example, ethylene glycol, propylene glycol, etc., may also be used. The inert hydrocarbon solvent includes, for example, hexane and heptane. The concentration of the alcohol in the solution is not particularly limited and usually 0.01–5.0 mole/l.

In the present invention, the vanadium compound-containing solution and the alcohol-containing solution are mixed with stirring for 10–600 seconds to obtain a mixed solution, then the mixed solution is immediately fed into a polymerization vessel containing an organoaluminum compound, and ethylene and an α-olefin, or ethylene, an α-olefin and a non-conjugated diene compound are copolymerized in the polymerization vessel.

The mixing proportion of the vanadium compound and the alcohol in the mixed solution is, in terms of molar ratio of the alcohol to the vanadium compound, usually 1–3, preferably 1–2. When the proportion of alcohol is too small, the intended vanadium compound containing an alkoxy group cannot be obtained sufficiently. When the proportion of alcohol is too large, on the other hand, unreacted alcohol enters in the polymerization vessel, leading to inactivation of the catalyst.

The vanadium compound-containing solution and the alcohol-containing solution are mixed with stirring for 10–600 seconds, preferably 15–300 seconds, to form a mixed solution, which is immediately fed into the polymerization vessel. When the mixing time is too short, it is difficult, owing to limitation by equipment, to make the reaction of the vanadium compound with the alcohol proceed sufficiently, and resultantly the activity of the catalyst obtained is unsatisfactory. When the time is too long, on the other hand, a precipitation product is formed, causing the deterioration of catalytic activity and the blockage of the catalyst inlet pipeline.

The mixing of the vanadium compound-containing solution and the alcohol-containing solution with stirring can be carried out, for example, by using an orifice, line mixer, static mixer, mixing nozzle, etc. in the pipeline. As specific examples of preferable operation conditions, the following can be referred to: inside diameter of pipeline: 0.1–5 cm, flow rate of the fluid in pipeline: 0.01–200 ml/sec, length of pipeline from the point of mixing to the polymerization vessel: 20–5,000 cm, temperature of the fluid in pipeline: –80° to 100° C.

The mixed solution thus obtained is immediately fed into the polymerization vessel containing an organoaluminum compound. The organoaluminum compound is preferably a compound represented by the formula $R_nAlX_{3-n}$ (wherein R is an aliphatic hydrocarbon group having 1–12 carbon atoms, X is a halogen, and n is a real number specified by $0<n\leq3$). Specific examples thereof include trimethylaluminum, triethylaluminum, triisobutylaluminum, trioctylaluminum, diethylaluminum monochloride, diethylaluminum monobromide, ethylaluminum sesquichloride, isobutylaluminum sesquichloride, n-butylaluminum sesquichloride, and ethylaluminum dichloride. The amount of the organoaluminum compound used in the polymerization vessel is usually 2–200 moles, preferably 3–50 moles, per 1 mole of the vanadium compound.

A specific example of the process for copolymerization is shown below. Thus, an inert hydrocarbon, such as hexane or heptane, or liquified propylene is used as a solvent; an organoaluminum compound, ethylene, an α-olefin and, if necessary, a non-conjugated diene are introduced into a polymerization vessel, the temperature in the polymerization vessel is maintained to a desired polymerization temperature of –50° to 100° C., preferably –30° to 80° C., and the mixed solution of the present invention is fed into the polymerization vessel to carry out polymerization. The pressure at the time of polymerization is usually from atmospheric pressure to 20 atm. In the polymerization, hydrogen, which is a molecular weight controlling agent, may be used according to necessity.

Though the features of the present invention were mentioned in respective relevant parts of the above description, the most distinguished feature and its action are as follows.

Thus, the most distinguished feature of the present invention lies in that the vanadium compound-containing solution and the alcohol-containing solution are mixed with stirring for a predetermined time and immediately thereafter fed into the polymerization vessel and that by this method the problems of deposition of the by-product of the reaction of the vanadium compound and the alcohol as precipitate in the apparatus and the lowering of the activity of catalyst can be solved without using such additional operations as bubbling.

The present invention will be illustrated by way of the following Examples.

EXAMPLE 1

In a separable flask of 2-l volume was placed 1 l of heptane and then, in a constant temperature bath at 45° C., a gas mixture consisting essentially 80% by mole of ethylene and 20% by mole of butene was passed therethrough at a rate of 5.65 NL (normal liter)/min until saturation. Then, 0.8 mmole of ethylaluminum sesquichloride was added into the flask. Further, 0.1 mmole of vanadium oxytrichloride and 0.2 mmole of n-butyl alcohol were mixed with stirring for 180 seconds in a dropping funnel and then added into the flask. Thereafter, the same gas mixture of ethylene and butene as above were passed through the flask for 20 minutes while stirring the reaction mixture, to effect copolymerization.

Then 20 ml of methyl alcohol was added to the resulting reaction product to stop the reaction. Thereafter heptane was distilled off under reduced pressure, and the resulting concentrated copolymer solution was poured into 1 l of methyl alcohol to precipitate the polymer. Then the precipitate was dried under vacuum to obtain a white amorphous solid copolymer. The results obtained are shown in Table 1. As shown in the Table, no gel was formed in the polymerization vessel and the yield of copolymer per unit amount of vanadium compound obtained according to the present invention was high. Further, it was confirmed by visual observation that no precipitate resulting from the reaction of the vanadium compound and the alcohol was formed in the liquid inlet pipe.

COMPARATIVE EXAMPLE 1

Example 1 was repeated except that the time of mixing vanadium oxytrichloride and n-butyl alcohol was changed to 3 seconds. The results obtained are shown in Table 1. In contrast with Example 1, gel was formed in the polymerization vessel and the yield of copolymer per unit amount of vanadium compound was low.

COMPARATIVE EXAMPLE 2

In a separable flask of 2-l volume was placed 1 l of heptane and then, in a constant temperature bath at 45° C., a gas mixture consisting essentially of 80% by mole of ethylene and 20% by mole of butene was passed therethrough at a rate of 5.65 NL/min until saturation. Separately, a 100-ml four-necked flask equipped with a stirrer and a thermometer was evacuated, then the inner atmosphere was replaced with nitrogen, and 2 mmoles of vanadium oxytrichloride, 4 mmoles of isopropyl alcohol and 20 ml of hexane were placed therein. When the resulting mixture was stirred for 1800 seconds at room temperature, a tarry substance was formed in the flask, making it impossible to transfer the reaction mixture through the pipeline into the separable flask and to carry out polymerization.

EXAMPLE 2

From the lower part of a 10-l stainless steel autoclave equipped with a stirrer were supplied, per one hour, 10 kg of hexane, 0.20 kg of ethylene, 0.81 kg of propylene and 0.03 kg of 5-ethylidene-2-norbornene and further 0.05% by mole of hydrogen. As a catalyst, ethylaluminum sesquichloride was continuously fed at a rate of 3.86 g/hour, while vanadium oxytrichloride and n-butyl alcohol were passed respectively at a rate of 0.68 g/hour and 0.29 g/hour through a pipe line connected with a static mixer (T3-17, a trade name, mfd. by Noritake Co., element number 17, inside diameter 0.34 cm, length 10 cm), continuously mixed in the pipeline and fed to the polymerization vessel. The molar ratio of n-butyl alcohol to vanadium oxytrichloride was 1.0, the flow rate of the vanadium compound-containing solution and the alcohol-containing solution was 1.94 ml/sec, the length of pipeline from the point of mixing of the vanadium compound-containing solution and the alcohol-containing solution to the polymerization vessel was 300 cm, the time elapsed from mixing of the vanadium compound-containing solution and the alcohol-containing solution till arrival at the inlet port of the polymerization vessel was 14.0 seconds, and the polymerization temperature was 55° C. The reaction liquid was withdrawn continuously, a polymerization terminating agent was added thereto, and copolymer was precipitated by steam stripping and dried. Thus 320 g/hour of copolymer was obtained. The copolymer had an ethylene content of 58% by weight, iodine value of 9.4 and Mooney viscosity, $ML_{1+4}$ 100° C., of 67.

The copolymer thus obtained was compounded with, based on 100 parts by weight of the copolymer, 50 parts by weight of carbon black, 15 parts by weight of paraffinic oil, 5 parts by weight of zinc flower, 1 part by weight of stearic acid, 1 part by weight of accelerator TS, 0.25 part by weight of accelerator M and 1 part by weight of sulfur, and the resulting compound was press-cured at 160° C. for 30 minutes. The property of the cured rubber determined according to JIS K6301 was as follows: breaking strength 148 kgf/cm², elongation at break 410%, JIS-A hardness 65, tear strength 37 kgf/cm, compressive set (−20° C.×22 hour) 31%.

TABLE 1

|  | Example 1 | Comparative Example 1 |
|---|---|---|
| n-BuOH/VOCl₃ (molar ratio)[1)] | 2.0 | 2.0 |
| Stirring-mixing time (sec)[2)] | 180 | 3 |
| Catalyst efficiency[3)] | 48 | 40 |
| Gel formation[4)] | No | Yes |

Note:
[1)]n-BuOH: n-butyl alcohol VOCl₃: vanadium oxytrichloride
[2)]Stirring-mixing time: the time of stirring and mixing of the vanadium compound-containing solution and the alcohol-containing solution
[3)]Catalyst efficiency: Copolymer obtained (g)/vanadium compound used (mmole)
[4)]Gel formation: Presence of gel formation in polymerization vessel As described above, according to the present invention, a process for producing ethylene-α-olefin copolymer rubbers can be provided which can maintain the activity of polymerization catalyst at a sufficiently high level, does not cause the reaction by-product of a vanadium compound and an alcohol to deposit as precipitate in the apparatus and does not need such additional operations as bubbling.

EXAMPLE 3

From the lower part of a 10-l stainless steel autoclave equipped with a stirrer were supplied, per one hour, 10 kg of hexane, 0.21 kg of ethylene, 0.80 kg of propylene and 0.03 kg of 5-ethylidene-2-norbornene and further 0.05% by mole of hydrogen. As a catalyst, ethylaluminum sesquichloride was continuously fed at a rate of 0.99 g/hour, while vanadium oxytrichloride and ethyl alcohol were passed respectively at a rate of 0.23 g/hour and 0.07 g/hour through a pipeline connected with a static mixer (T3-17, a trade name, mfd. by Noritake Co., element number 17, inside diameter 0.34 cm, length 10 cm), continuously mixed in the pipeline and fed to the polymerization vessel. The molar ratio of ethyl alcohol to vanadium oxytrichloride was 1.2, the flow rate of the vanadium compound-containing solution and the alcohol-containing solution was 1.32 ml/sec, the length of pipeline from the point of mixing of the vanadium compound-containing solution and the alcohol-containing solution to the polymerization vessel was 69 cm, the time elapsed from mixing of the vanadium compound-containing solution and the alcohol-containing solution till arrival at the inlet port of the polymerization vessel was 20.0 seconds, and the polymerization temperature was 46° C. The reaction liquid was withdrawn continuously, a polymerization terminating agent was added thereto, and copolymer was precipitated by steam stripping and dried. Thus 340 g/hour of copolymer was obtained. The copolymer had an ethylene content of 53% by weight, iodine value of 8.8, and Mooney viscosity, $ML_{1+4}$ 121° C., of 83.

The copolymer thus obtained was compounded with, based on 100 parts by weight of the copolymer, 130 parts by weight of carbon black, 40 parts by weight of calcium carbonate, 70 parts by weight of paraffinic oil, 5 parts by weight of zinc flower, 1 part by weight of stearic acid, 2 parts by weight of petroleum resin, 10 parts by weight of calcium oxide, 1.3 parts by weight of accelerator CZ, 1.5 parts by weight of accelerator BZ, 0.5 parts by weight of accelerator TT, 0.6 parts by weight of accelerator TRA and 1.2 parts by weight of sulfur, and the resulting compound was press-cured at 160° C. for 30 minutes. The property of the cured rubber determined according to JIS K6301 was as follows: breaking strength 144 kgf/cm², elongation at break 330%, JIS-A hardness 80, tear strength 36 kgf/cm, compressive set (−20° C.×22 hour) 59%.

EXAMPLE 4

From the lower part of a 10-l stainless steel autoclave equipped with a stirrer were supplied, per one hour, 10 kg of hexane, 0.21 kg of ethylene, 0.80 kg of propylene and 0.03 kg of 5-ethylidene-2-norbornene and further 0.05% by mole of hydrogen. As a catalyst, ethylaluminum sesquichloride was continuously fed at a rate of 1.07 g/hour, while vanadium oxytrichloride and ethyl alcohol were passed respectively at a rate of 0.25 g/hour and 0.12 g/hour through a pipeline connected with a static mixer (T3-17, a trade name, mfd. by Noritake Co., element number 17, inside diameter 0.34 cm, length 10 cm), continuously mixed in the pipeline and fed to the polymerization vessel. The molar ratio of ethyl alcohol to vanadium oxytrichloride was 1.8, the flow rate of the vanadium compound-containing solution and the alcohol-containing solution was 0.68 ml/sec, the length of pipeline from the point of mixing of the vanadium compound-containing solution and the alcohol-containing solution to the polymerization vessel was 69 cm, the time elapsed from mixing of the vanadium compound-containing solution and the alcohol-containing solution till arrival at the inlet port of the polymerization vessel was 39 seconds, and the polymerization temperature was 46° C. The reaction liquid was withdrawn continuously, a polymerization terminating agent was added thereto, and copolymer was precipitated by steam stripping and dried. Thus 330 g/hour of copolymer was obtained. The copolymer had an ethylene content of 58% by weight, iodine value of 9.2 and Mooney viscosity, $ML_{1+4}$ 121° C., of 81.

The copolymer thus obtained was compounded with the same manner as Example 3. The property of the cured rubber determined according to JIS K6301 was as follows: breaking strength 136 kgf/cm$^2$, elongation at break 300%, JIS-A hardness 79, tear strength 36 kgf/cm, compressive set (−20° C.×22 hour) 55%.

EXAMPLE 5

From the lower part of a 10-1 stainless steel autoclave equipped with a stirrer were supplied, per one hour, 10 kg of hexane, 0.22 kg of ethylene and 0.38 kg of 1-butene and further 0.30% by mole of hydrogen. As a catalyst, ethylaluminum sesquichloride was continuously fed at a rate of 3.57 g/huor, while vanadium oxytrichloride and ethyl alcohol were passed respectively at a rate of 0.63 g/hour and 0.20 g/hour through a pipeline connected with a static mixer (T3-17, a trade name, mfd. by Noritake Co., element number 17, inside diameter 0.34 cm, length 10 cm), continuously mixed in the pipeline and fed to the polymerization vessel. The molar ratio of ethyl alcohol to vanadium oxytrichloride was 1.8, the flow rate of the vanadium compound-containing solution and the alcohol-containing solution was 0.28 ml/sec, the length of pipeline from the point of mixing of the vanadium compound-containing solution and the alcohol-containing solution to the polymerization vessel was 48 cm, the time elapsed from mixing of the vanadium compound-containing solution and the alcohol-containing solution till arrival at the inlet port of the polymerization vessel was 65.5 seconds, and the polymerization temperature was 60° C. The reaction liquid was withdrawn continuously, a polymerization terminating agent was added thereto, and copolymer was precipitated by steam stripping and dried. Thus 300 g/hour of copolymer was obtained. The copolymer had an ethylene content of 91% by weight and Melt Index, MI (190° C.), of 1.9 g/10 min.

The results obtained are shown in Table 2.

TABLE 2

|  | Example 3 | Example 4 | Example 5 |
|---|---|---|---|
| EtOH/VOCl$_3$ (molar ratio)$^{1)}$ | 1.2 | 1.8 | 1.8 |
| Stirring-mixing time (sec) | 20 | 39 | 65.5 |
| Catalyst efficiency | 241 | 228 | 83 |
| Gel formation | No | No | No |

$^{1)}$EtOH: ethyl alcohol

What is claimed is:

1. A process for producing ethylene-α-olefin copolymer rubbers which comprises mixing a vanadium compound-containing hydrocarbon solution and an alcohol-containing hydrocarbon solution with stirring for 10–600 seconds to obtain a mixed hydrocarbon solution, feeding the mixed hydrocarbon solution into a polymerization vessel containing an organoaluminum compound, and copolymerizing ethylene and an α-olefin, or ethylene, an α-olefin and a non-conjugated diene compound in the polymerization vessel.

2. The process according to claim 1, wherein the alcohol contained in the alcohol-containing hydrocarbon solution is an alcohol having an aliphatic hydrocarbon group of 1–12 carbon atoms.

3. The process according to claim 1, wherein the mixing of the vanadium compound-containing hydrocarbon solution and the alcohol-containing hydrocarbon solution with stirring is carried out by means of a static mixer.

4. The process according to claim 1, wherein the mixing of the vanadium compound-containing hydrocarbon solution and the alcohol-containing hydrocarbon solution with stirring is carried out in a turbulent flow region formed by using an orifice.

5. The process according to claim 1, wherein the organoaluminum compound is represented by the formula $R_nAlX_{3-n}$, wherein R represents an aliphatic hydrocarbon group having 1 to 12 carbon atoms, X represents a halogen, and n is a real number specified by $0<n\leq3$.

6. The process according to claim 1, wherein the alcohol and the vanadium compound are present in the mixed solution at a molar ratio of from 1 to 3.

7. The process according to claim 1, wherein the vanadium compound is represented by the formula $VOY_3$, wherein Y is a halogen.

8. The process according to claim 1, wherein in the vanadium compound-containing hydrocarbon solution, the concentration of the vanadium compound is 0.01–5.0 mole/liter.

9. The process according to claim 1, wherein in the vanadium compound is vanadium tetrachloride, vanadium tetrabromide, vanadium oxytricholride, or vanadium oxybromide.

10. The process according to claim 1, wherein the vanadium compound-containing hydrocarbon solution and the alcohol-containing hydrocarbon solution are mixed with stirring for 15–300 seconds.

11. The process according to claim 1, wherein the amount of the organoaluminum compound used in the polymerization vessel is 2–200 moles per one mole of the vanadium compound.

12. The process according to claim 1, wherein in the alcohol-containing hydrocarbon solution, the concentration of the alcohol is 0.1–5.0 moles/liter.

13. A process for producing ethylene-α-olefin copolymer rubbers which comprises mixing a vanadium compound-containing hydrocarbon solution and an alcohol-containing hydrocarbon solution with stirring 10–600 seconds to obtain a mixed solution, said vanadium compound being a vanadium halide or a vanadium oxyhalide, and said alcohol contained in the alcohol-containing hydrocarbon solution is an alcohol having an aliphatic hydrocarbon group of 1–12 carbon atoms;

feeding the mixed solution into a polymerization vessel containing an organoaluminum compound wherein said organoaluminum compound is represented by the formula $R_nAlX_{3-n}$ in which R represents an aliphatic hydrocarbon group having 1–12 carbon atoms, X represents a halogen atom, and n is a real number specified by $0<n\leq3$, and copolymerizing ethylene and an α-olefin, or ethylene, an α-olefin and a non-conjugated diene compound in the polymerization vessel in the presence of said mixed solution.

14. The process according to claim 12, wherein an ethylene-α-olefin copolymer rubber is formed which is essentially 40–95% by mole of ethylene, 5–60% by mole of an α-olefin and 0–10% by mole of a non-conjugated diene compound.

15. The process according to claim 12, wherein said α-olefin is propylene, butene-1, pentene-1, hexene-1, heptene-1, octene-1, isobutylene or 4-methylpentene-1.

16. The process according to claim 12, wherein a non-conjugated diene compound is present during said copolymerizing, and said non-conjugated diene compound is 1,4-penadiene, 1,4-hexadiene, 1,5-cyclooctadiene, 6-methyl-4,7,8,9-tetrahydroindene, dicyclopentadiene, 5-vinyl-2-norbornene, or 5-ethylidene-2-norbornene.

17. The process according to claim 12, wherein the mixing of the vanadium-containing hydrocarbon solution and the alcohol-containing hydrogen carbon solution where stirring is carried out in a turbulent flow region formed by using an orifice.

18. The process according to claim 12, wherein the mixing of the vanadium-compound-containing hydrocarbon solution and the alcohol-containing hydrocarbon solution with stirring is carried out by means of a static mixer.

\* \* \* \* \*